United States Patent Office 3,331,776
Patented July 18, 1967

3,331,776
LUBRICATING OIL COMPOSITION
Maurits Krukziener, Amsterdam, Netherlands, assignor to Shell Oil Company, New York, N.Y., a corporation of Delaware
No Drawing. Filed Sept. 19, 1963, Ser. No. 310,150
Claims priority, application Netherlands, Oct. 4, 1962, 283,936
7 Claims. (Cl. 252—56)

This invention relates to lubricating oil compositions and novel non-ash forming additives therefor.

It is known that ash forming oil additives such as metal sulfonates, phosphates, phenates, etc. are undesirable because of their tendencies to form ash deposits when used as additives in lubricating oils. Because of this, non-ash forming polymeric detergents have been developed such as basic amino-containing polymers such as copolymers of alkyl acrylates and amino-alkyl acrylates or copolymers of alkyl acrylates and polymerizable heterocyclic amines such as vinyl pyridine or amino-imides of mono substituted (polyisobutylene) succinic anhydride. These materials are basic and tend to interact with acidic by-products formed in lubricants during engine operation to form undesirable side reaction resulting in sludge formation, corrosion and wear.

It is known that certain esters of succinic anhydride and alkanediols or glycol ethers as described in U.S. Patents 2,993,773 and 3,045,042 are good rust inhibiting agents in lubricants or are effective deposit modifiers for hydrocarbon fuels. However, such esters do not possess detergent properties.

It has now been found that lubricating oil compositions possessing outstanding detergent properties can be obtained by incorporating into a lubricating oil a minor amount (0.1–10% by wt.) an oil soluble mono- or diester of a mono substituted (polyolefin) succinic anhydride

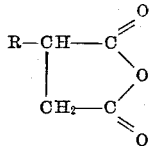

and an alkane polyol having at least 4 or more hydroxyl groups. The R radical is a hydrocarbyl radical of from 30 to 700 carbon atoms, e.g. an alkyl or alkenyl radical of from 80 to 300 carbon atoms. This radical R attached to maleic anhydride to form the mono(polyolefin) succinic anhydride functions not only as an oil-solubilizer but provides also detergent properties to the ester. Examples of such polymers include polyethylene, polypropylene, polybutene, polyisobutylene, copolymer of ethylene/propylene, copolymer ethylene/isobutylene, copolymer of ethylene/alpha-methyl styrene and the like. Monoalkylation of maleic anhydride with the above type olefinic polymers may also be made by conventional means known in the art, preferably in the absence of a catalyst and at temperatures ranging from about 300 to 600° F., preferably between 350° F. and 450° F. The mole ratio of the polyolefin to maleic anhydride may vary from 1:1 to 1:10, preferably from 1:1 to 1:5, respectively. Particularly useful in the monoalkylation of maleic anhydride are polyisobutylenes in the molecular weight range of 300 to 5000, preferably from 800 to 1500.

The alkenyl or alkyl group may be either unbranched or branched; preference is given to an ester of an alkenyl- or alkyl-succinic acid with a branched alkenyl or alkyl group, particular preference being given to an ester of mono(polyisobutenyl) succinic acid.

Lubricants according to the invention can be obtained both by addition of monoesters and by addition of diesters of alkenyl- or alkyl-succinic acid. It is also possible to add a mixture of monoester and a diester of one or of various alkenyl- or alkyl-succinic acids.

The alkane polyols useful in making the esters are alkanepolyols having at least three and preferably at least four hydroxy groups such as the trihydroxyalkanes, e.g. trihydroxybutanes, pentanes, hexanes, heptane, octanes, nonanes, dodecanes, etc., as well as tetrahydroxy alkanes, pentahydroxyalkanes, hexahydroxyalkanes, as well as the sugar alcohols such as erythritol, pentaerythritol tetritols, pentitols, hexitols, mannitol, sorbitol, glucose, and the like. Particularly preferred alcohols are pentaerythritol and mannitol.

The esters are prepared by any suitable means and are exemplified by mono- and di-esters of mono(polyisobutylene) succinic acid, mono(polyethylene/propylene) succinic acid, mono(polyethylene/alpha-methyl styrene) succinic acid (the polyhydrocarbyl radicals having from 80–300 carbon atoms) and mannitol, erythritol, pentaerythritol, tetrahydroxy pentane, tetrahydroxyhexane, and the like. Particularly preferred esters are:

(A) The diester of mono(polyisobutenyl) succinic acid with a polyisobutenyl group of, on an average, 80 carbon atoms, and mannitol.

(B) The diester of mono(alkylene) succinic acid with an alkylene group of on an average, 240 carbon atoms derived from a copolymer of equimolar quantities of ethylene and propylene, and mannitol.

(C) The monoester of mono(polyisobutenyl) succinic acid with a polyisobutenyl group of, on an average, 200 carbon atoms and erythritol.

(D) The diester of mono(polyisobutenyl) succinic acid with a polyisobutenyl group of, on an average, 200 carbon atoms and erythritol.

(E) The monoester of mono(alkenyl) succinic acid with an alkenyl group of, on an average 80 carbon atoms, derived from a copolymer of equimolar quantities of ethylene and propylene, and pentaerythritol.

(F) The monoester of mono(polyisobutenyl) succinic acid with a polyisobutenyl group of, on an average, 76 carbon atoms, and pentaerythritol.

(G) The diester of mono(polyisobutenyl) succinic acid with a polyisobutenyl group of, on an average, 76 carbon atoms, and pentaerythritol.

(H) The diester of mono(polyisobutenyl) succinic acid with a polyisobutenyl group of, on an average, 104 carbon atoms, and pentaerythritol.

(I) The monoester of mono(alkylene) succinic acid with an alkylene group of, on an average, 240 carbon atoms derived from a copolymer of equimolar quantities of ethylene and alpha-methyl styrene and mannitol.

(J) The monoester of mono(polyisobutenyl) succinic acid with a polyisobutenyl group of, on an average, 105 carbon atoms, and mannitol.

ENGINE TESTS

Lubricant compositions obtained according to the invention were tested in a Gardner diesel engine, a Petter gasoline engine and a Peugeot gasoline engine.

Gardner diesel engine

Water-cooled four-stroke engine, bore 108 mm., stroke 152.4 mm., piston displacement 1.4 liters, power output 11 HP at 1200 r.p.m. Duration of the test: 17 hours. The fuel was a gas oil with a sulfur content of 0.9% w. The temperature of the cooling water was 80° C. In this engine the piston fouling was rated.

Petter gasoline engine

Water-cooled four-stroke engine, bore 85 mm., stroke 82.5 mm., piston displacement 478 ml., compression ratio 10.0:1, power output 3.5 HP at 1500 r.p.m. Duration of test: 48 hours. The fuel was a motor gasoline with 0.32 ml. TEL[1] per liter and a sulfur content of 0.05% w. The temperature of the cylinder cooling water was 80° C. The temperature of the cooling water of the cooled timing gear cover was 24° C. In this test the degree of piston fouling and sludge formation was rated.

*Peugeot 4-cylinder gasoline engine*

Water-cooled four-stroke engine, bore 75.0 mm., stroke 73.0 mm., total piston displacement 1.29 liters. The test was carried out under varying conditions corresponding to alternate operation in town traffic and on country roads. Duration of the test: 150 hours. The fuel was a preminum motor gasoline with 0.54 ml. TEL[1] per liter (F–1 octane number 101) and a sulfur content of 0.10% w. The temperature of the cylinder cooling water was alternately 40 and 80° C. In this test the degree of piston fouling and sludge formation was rated.

The concentration of the additive in the finished lubricant was 1.5% w.; the base oil used was a solvent-refined paraffinic lubricating oil distillate. The viscosity of the base oil was 7.2 cs. at 98.9° C., except in the Gardner test where it was 11.5 cs. at 98.9° C.

The results of the engine tests are recorded in the table.

| Additive | Gardner diesel piston cleanliness (10=clean) | Petter | | Peugeot | |
|---|---|---|---|---|---|
| | | Sludge formation | Piston cleanliness | Sludge formation | Piston cleanliness |
| | | (10=clean) | | (10=clean) | |
| None | 4.5 | 4.9 | 5.3 | 7.6 | 5.5 |
| F | 6.0 | | | | |
| G | 7.6 | 9.0 | 7.0 | | |
| H | | | | 9.0 | 7.4 |
| J | | 8.5 | 7.2 | | |

Compositions of the present invention can be used to effectively lubricate automotive and truck engines as well as various industrial equipment such as railroad engines, tractors, earth movers, farm and mining machinery and the like.

I claim as my invention:

1. A lubricating composition comprising a major amount of mineral lubricating oil and from 0.1% to 10% of an oil-soluble detergent monoester of a mono substituted polyolefin succinic anhydride and an alkanepolyol selected from the group consisting of pentaerythritol and mannitol wherein the polyolefin radical contains from 30 to 700 carbon atoms.

2. The composition of claim 1 where the polyolefin radical contains from 80 to 300 carbon atoms.

3. A mineral lubricating oil composition comprising a major amount of mineral lubricating oil and from 0.1% to 10% of an oil-soluble monoester of mono(polyisobutylene) succinic acid, the polyisobutylene having from 70 to 200 carbon atoms, and pentaerythritol.

4. A mineral lubricating oil composition comprising a major amount of mineral lubricating oil and from 0.1% to 10% of an oil-soluble monoester of mono(polyisobutylene) succinic acid, the polyisobutylene having from 70 to 200 carbon atoms, and mannitol.

5. A mineral lubricating oil composition comprising a major amount of mineral lubricating oil and from 0.1% to 10% of a monoester of mono(alkylene) succinic acid, the alkylene group having from 70 to 200 carbon atoms derived from a copolymer of equimolar quantities of ethylene and propylene, and pentaerythritol.

6. A mineral lubricating oil composition comprising a major amount of mineral lubricating oil and from 0.1% to 10% of a monoester of mono(alkylene) succinic acid, the alkylene group having from 70 to 200 carbon atoms derived from a copolymer of equimolar quantities of ethylene and propylene, and mannitol.

7. A mineral lubricating oil composition comprising a major amount of mineral lubricating oil and from 0.1% to 10% of a monoester of mono(alkylene) succinic acid, the alkylene group having from 70 to 200 carbon atoms derived from a copolymer of equimolar quantities of ethylene and alpha-methyl styrene and pentaerythritol.

References Cited

UNITED STATES PATENTS 3,057,890  10/1962  De Groote _____ 260—485
3,117,091  1/1964   Staker _____ 252—56
3,255,108  7/1966   Wiese _____ 252—32.7

OTHER REFERENCES

Glycol Esters of Dibasic Acids, Shorland, J. Am. Chem. Soc., vol. 57, 1935, pp. 115, 116.

DANIEL E. WYMAN, *Primary Examiner.*

W. H. CANNON, J. R. McBRIDE, *Assistant Examiners*

---

[1] By TEL is understood the commercially available "Ethyl Fluid," which contains 61.48% w. of tetraethyl lead, 18.8% w. of dichloroethane and 17.86% w. of dibromethane (balance: coloring matter and kerosene).